United States Patent [19]

Persson et al.

[11] Patent Number: 5,685,557
[45] Date of Patent: Nov. 11, 1997

[54] STEERING WHEEL WITH INTEGRAL MOUNTING STRUCTURE FOR AN AIR-BAG ASSEMBLY

[75] Inventors: Dan Persson, Alingsas; Michael Ahlkvist, Gothenburg, both of Sweden

[73] Assignee: Autoliv Development AB, Vargarda, Sweden

[21] Appl. No.: 458,420

[22] Filed: Jun. 2, 1995

[30] Foreign Application Priority Data

Jun. 7, 1994 [GB] United Kingdom .................. 9411392

[51] Int. Cl.⁶ .................................................. B60R 21/20
[52] U.S. Cl. .......................... 280/728.2; 280/731; 74/552
[58] Field of Search ........................ 280/731, 728.2, 280/728.3, 728.1, 730.1, 732; 74/552

[56] References Cited

U.S. PATENT DOCUMENTS

| 4,101,146 | 7/1978 | Oehm | 280/731 |
| 4,167,276 | 9/1979 | Bell et al. | 280/731 |
| 4,828,286 | 5/1989 | Fohl | 280/731 |
| 4,968,057 | 11/1990 | Rafferty | 280/731 |
| 5,243,877 | 9/1993 | Numata | 280/731 |
| 5,356,173 | 10/1994 | Hongou et al. | 280/731 |
| 5,470,099 | 11/1995 | Williams | 280/731 |
| 5,480,184 | 1/1996 | Young | 280/731 |

FOREIGN PATENT DOCUMENTS

| 3630685 | 2/1988 | Germany. | |
| 4-169356 | 6/1992 | Japan | 280/728.2 |
| 2270882 | 3/1994 | United Kingdom | 280/728.2 |

*Primary Examiner*—Kevin Hurley
*Assistant Examiner*—Peter C. English
*Attorney, Agent, or Firm*—Spencer & Frank

[57] ABSTRACT

A safety device for a steering wheel unit. The safety device includes a one-piece metal core having: a rim; a plurality of spokes extending from the rim; a hub structure being disposed such that the spokes extend from the rim to the hub structure; and a mounting structure disposed adjacent the hub structure. The safety device further includes an air-bag assembly having: a gas generator directly connected to the mounting structure; an air-bag adapted to be in gas communication with the gas generator and being directly connected to the mounting structure; and an air-bag cover adapted to cover the air-bag and being directly connected to the mounting structure.

9 Claims, 3 Drawing Sheets

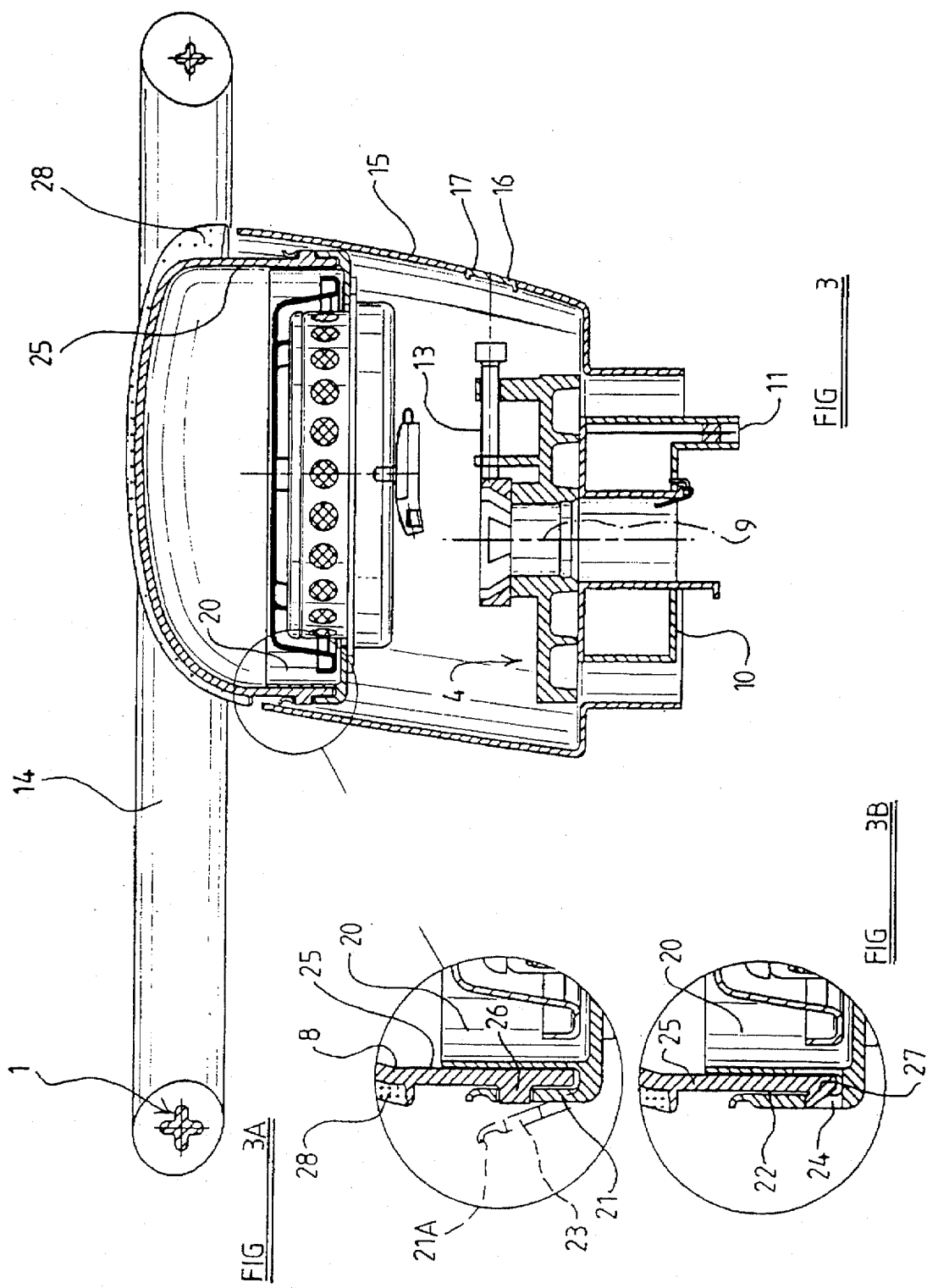

STEERING WHEEL WITH INTEGRAL MOUNTING STRUCTURE FOR AN AIR-BAG ASSEMBLY

BACKGROUND OF THE INVENTION

The present invention relates to a safety arrangement and more particularly relates to a safety arrangement intended for use in a motor vehicle.

It has been proposed previously to provide an air-bag within the steering wheel of a motor vehicle. Many proposals involve the use of a steering wheel which is adapted to be mounted in position on the steering column of a motor vehicle, whilst the vehicle is being assembled, the steering wheel being adapted to have the air-bag mounted in position within the steering wheel during the final stage of manufacture of the vehicle. This procedure has been favoured because a typical air-bag does include a pyrotechnic material which, when ignited, provides the gas which inflates the bag, and it is preferred not to have such pyrotechnic material present within a vehicle under construction for longer than is absolutely necessary.

It has also been proposed, however (see DE-A3630685) to provide a steering wheel which has an air-bag mounted on it, the steering wheel being designed so that, even with the air-bag in position, the steering wheel can be mounted on the steering column of a motor vehicle. When using a steering wheel of this type the entire steering wheel is mounted in position on the steering shaft of the vehicle as the final step in vehicle assembly.

The disadvantage of these prior proposals is that the arrangements have been relatively complex, involving the use of a large number of different components.

OBJECT OF THE INVENTION

The present invention seeks to provide an improved safety arrangement.

SUMMARY OF THE INVENTION

According to one aspect of this invention there is provided a safety device which comprises steering wheel unit including an integrally formed or one-piece metal core having a rim, spokes and a hub portion, all formed integrally, the metal core also integrally comprising a mounting structure. The safety device further includes a gas generator, an air-bag connected to the mounting structure, and a cover for the air-bag mounted directly to the mounting structure.

Preferably the core structure is made of magnesium alloy.

Advantageously the mounting structure comprises a platform located above the hub portion.

Preferably the platform defines an aperture adapted to receive part of a gas generator.

Conveniently the platform is provided with a wall which substantially surrounds the aperture, the wall extending substantially perpendicularly to the platform.

Advantageously the platform is provided with a plurality of integrally formed tongues for fixing the cover to the mounting structure, the tongues being located adjacent the wall.

Preferably the tongues are each provided with an aperture adapted to engage a projection provided on the cover.

Conveniently at least some of the tongues are plastically deformable between an initial unlocked position in which the aperture in the tongue does not engage a projection located on the cover and a locked position in which the aperture on the tongue does engage a projection on the cover.

Alternatively the tongues are each provided with a projection adapted to engage an aperture provided on the cover.

In such an embodiment preferably at least some of the tongues are plastically deformable between an initial unlocked position in which the projection on the tongue does not engage an aperture provided in the cover and a locked position in which the projection on the tongue does engage an aperture in the cover.

Conveniently at least some of the tongues are resilient and resiliently engage the cover.

BRIEF DESCRIPTION OF THE DRAWINGS

FIG. 3 is a sectional view taken on the line III—III of FIG. 1, FIG. 3A is an enlarged view of part of FIG. 3 and, FIG. 3B is an enlarged view, similar to FIG. 3A showing another part of the steering wheel.

DETAILED DESCRIPTION

Figure 1:
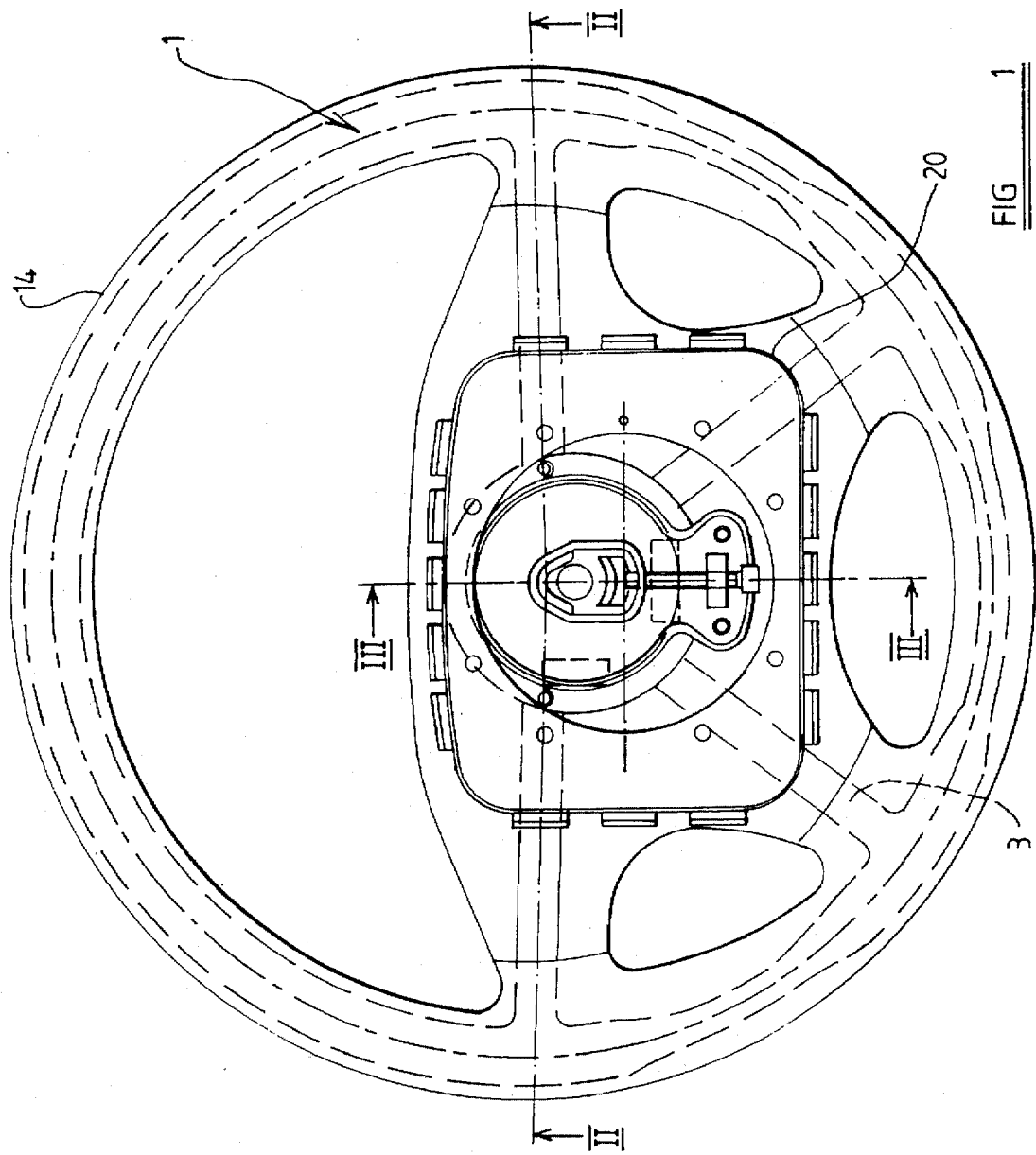
FIG. 1 is a top plan view of a steering wheel incorporating a safety device in accordance with the invention, with parts shown in phantom.

Referring to the drawings, a safety device in accordance with the present invention is in the form of a steering wheel unit comprising a metal structure 1 which is integrally formed, i.e. formed as an integral die-cast element. The structure 1 defines the rim 2 of the steering wheel. Its seen in FIG. 1 and 2, a plurality of substantially radially extending spokes 3 serve to connect the rim 2 and a hub structure 4 used to mount the steering wheel in position on a steering shaft. The spokes 3 also support a mounting structure 5 on which is mounted directly a gas generator 6 associated with a folded air-bag 7 and a cover 8 for the air-bag. The rim 2, spokes 3, hub structure 4 and mounting structure 5 comprise the integral metal structure 1.

It is thus to be appreciated that the arrangement of the invention utilises a minimum number of components, reducing overall costs and facilitating assembly.

The metal structure 1 is made of a magnesium alloy and defines a rim 2 of substantially cruciform shape in cross-section, the rim being interconnected by a plurality (in the illustrated example, four) substantially radially inwardly extending spokes 3 which terminate at the hub structure 4. The hub structure 4 defines an axially extending passage 9 dimensioned to receive a terminal portion of a steering shaft when the wheel is mounted in position. Extending from the hub structure 4 is an annular housing 10 adapted to receive a spiral wound connector coil. The connection coil has one end which may emerge through a lower opening 11 formed in the housing (see FIG. 3) and which may be connected to part of the wiring loom of the vehicle. The other end of the connector core emerges through an opening 12 formed in the upper part of the housing (see FIG. 2), which may be connected to a squib forming an ignition device for the gas generator 6.

As can be seen most clearly in FIG. 3, the hub structure 4 defines an internally threaded bore which receives a horizontally extending grub screw 13, the grub screw being adapted to engage the terminal part of a steering shaft on which the steering wheel is mounted to secure the steering wheel in position.

The outer rim 2 of the metal structure is surrounded by a moulded-on finger grip 14 formed of an appropriate soft plastics material. The finger grip may surround the terminal portion of each of the radially extending spokes 3.

A pre-moulded back shell 15 is provided which is snap-fitted or otherwise bonded to part of the moulding 14 to provide a protective cover for the under-part of the steering wheel.

As can be seen most clearly in FIG. 3, a removable disc 16 is mounted in position in an aperture 17 formed within the back shell, the disc being removable to provide access to the grub screw 13.

The metal core 1 is formed integrally with the mounting structure 5. The mounting structure 5 comprises a substantially transversely extending planar platform portion 18 defining a central aperture 19 dimensioned to receive part of the gas generator 6, the platform portion 18 having an upstanding side wall 20 which, as can be seen from FIG. 1, is substantially rectangular in plan. Also upstanding from the platform 18 at positions slightly spaced outwardly from the upstanding wall 20 are a plurality of tongues 21,22. The nature of the tongues 21 is shown most clearly in FIG. 3A and the nature of the tongues 22 is shown most clearly in FIG. 3B.

The tongues 21 are plastically deformable and initially occupy the position shown in dotted lines 21A of FIG. 3A. Each tongue 21 defines an aperture 23. The tongue may be moved from the dotted line position 21A to the solid line position 21 with a consequent plastic deformation when the cover 8 for an air-bag has been mounted in position.

The tongue 22 is a resilient tongue which is spring biassed to the solid line position shown in FIG. 3B. The resilient tongue 22 defines adjacent its base an aperture 24.

The cover 8 for the air-bag comprises a substantially vertical side wall 25 adapted to be received snugly around the exterior of the upstanding wall 20 provided on the platform portion 18. The vertical wall 25 carries a plurality of outwardly directed protrusions 26,27. The protrusions 26 are provided at a position spaced above the lower edge of the side wall 25. The protrusions 27 are provided at the lower edge of the side wall 25 and, in contrast to the protrusions 26, are chamfered.

As the cover is lowered into position the chamfered protrusions 27 which are aligned with resilient tongues 22 deform the resilient tongues until the tongues snap back into a position with the protrusions 27 located in the apertures 24. Subsequently, the deformable tongues 21, which initially occupy the position 21A shown in dotted lines in FIG. 3A, may be moved to the position shown in solid lines in FIG. 3A when the apertures 23 will be engaged with projections 26 provided on the side wall 25 of the cover, thus securely retaining the cover in position.

It is to be appreciated that details of the design may be reversed with each tongue carrying a projection, and with the cover defining apertures which are located to receive the projections carried by the tongues.

The upper part of the cover is provided with a foam outer layer 28.

Figure 2:
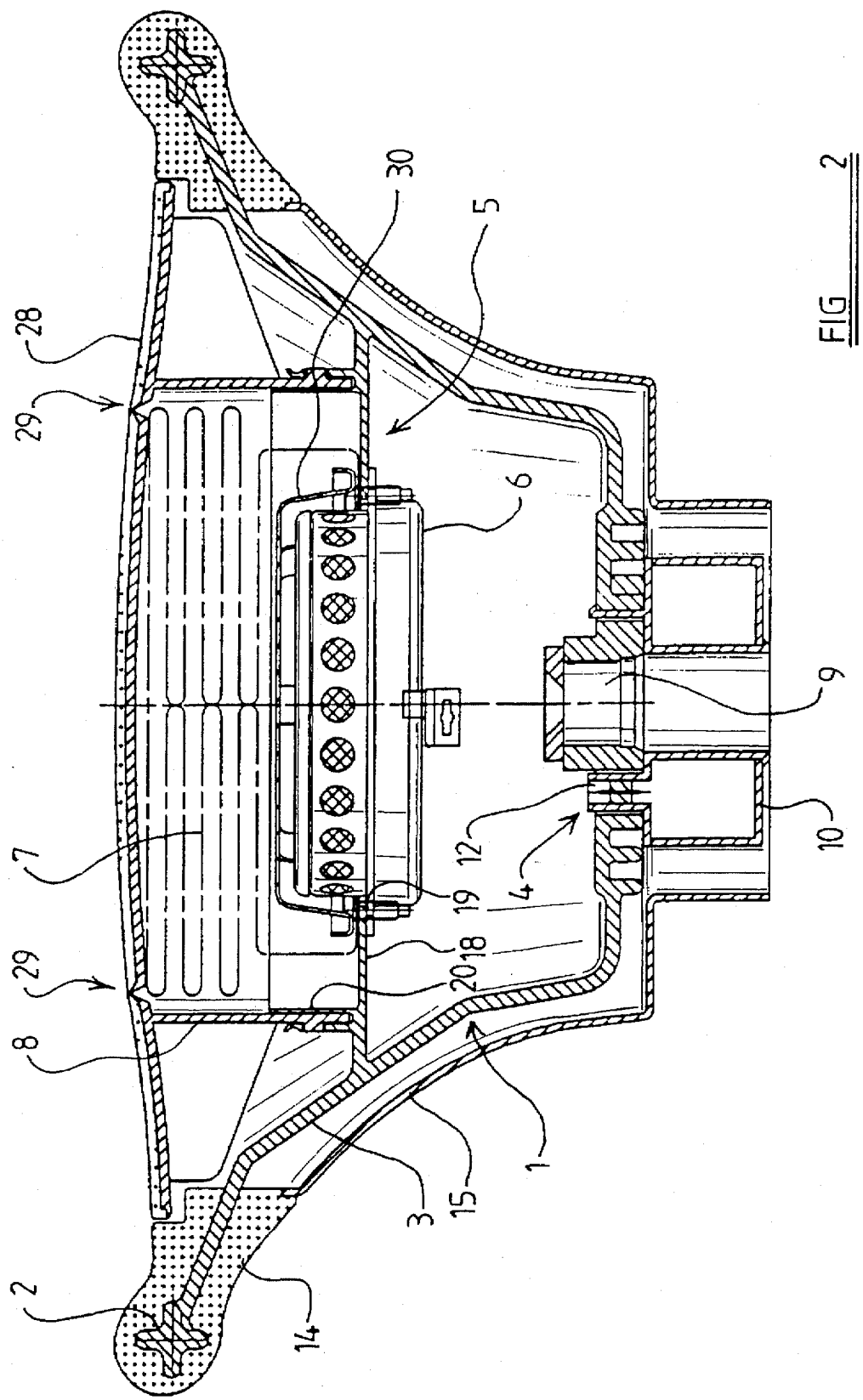
FIG. 2 is a sectional view taken along line II—II of FIG. 1.

As can be seen most clearly from FIG. 2, the upper part of the cover located above the air-bag 7 defines lines 29 of mechanical weakness, along which the cover may easily split when the air-bag is inflated.

The gas generator 6 is of conventional design, being provided with a spacing cage 30 located between the operative part of the gas generator and the air-bag to facilitate inflation of the air-bag.

It is to be appreciated that in assembling the steering wheel shown in FIGS. 1 to 3, initially the gas generator with the associated spacing cage 30 and the air-bag 7 will be mounted in position on the support structure 5, with the lower part of the gas generator being received within the aperture 19 formed by the platform 18. Subsequently the cover 8 will be mounted in position and will initially be located by the snap-fitting resilient tongues 22. Subsequently, the plastically deformable tongues 21 will be moved to the engaged position as shown in FIG. 3A in order to retain the cover securely in position. The complete steering wheel may then be mounted on a steering column as the final step in the manufacture of a motor vehicle.

What is claimed is:

1. A safety device for a steering wheel unit comprising:
   a one-piece metal core including:
      a rim;
      a plurality of spokes extending from the rim;
      a hub structure being disposed such that the spokes extend from the rim to the hub structure; and
      a mounting structure disposed adjacent the hub structure; and
   an air-bag assembly including:
      a gas generator directly connected to the mounting structure;
      an air-bag adapted to be in gas communication with the gas generator and being directly connected to the mounting structure; and
      an air-bag cover for covering the air-bag, the cover being directly connected to the mounting structure.

2. The safety device according to claim 1, wherein the core is made of magnesium alloy.

3. The safety device according to claim 1, wherein the mounting structure includes a platform located above the hub structure.

4. The safety device according to claim 3, wherein the platform defines an aperture therein for receiving a part of the gas generator for allowing a direct connection of the gas generator with the mounting structure.

5. The safety device according to claim 4, wherein the mounting structure further includes a wall extending from the platform, the wall substantially surrounding the aperture and extending substantially perpendicularly with respect to the platform.

6. The safety device according to claim 5, wherein the mounting structure further includes a plurality of tongues extending from the platform and located adjacent the wall, the tongues being effective for allowing a direct connection of the air-bag cover to the mounting structure.

7. The safety device according to claim 6, wherein:
   the air-bag cover includes a plurality of projections thereon; and
   the tongues each define an aperture therein for engaging a corresponding one of the projections on the air-bag cover.

8. The safety device according to claim 7, wherein at least some of the tongues are plastically deformable between an initial unlocked position in which the aperture in a corresponding one of said at least some of the tongues does not engage a corresponding one of the projections on the air-bag cover, and a subsequent locked position in which the aperture in the corresponding one of said at least some of the tongues does engage the corresponding one of the projections on the air-bag cover.

9. The safety device according to claim 1, wherein the core is a die-cast element.

* * * * *